(12) United States Patent
Bennett (10) Patent No.: US 6,216,675 B1
(45) Date of Patent: Apr. 17, 2001

(54) SYSTEM AND CONDENSER FOR FUEL INJECTION SYSTEM

(75) Inventor: David E. Bennett, Lake Lillian, MN (US)

(73) Assignee: Bi-Phase Technologies, L.L.C., Lake Lillian, MN (US)

( * ) Notice: Subject to any disclaimer, the term of this patent is extended or adjusted under 35 U.S.C. 154(b) by 0 days.

(21) Appl. No.: 09/274,183

(22) Filed: Mar. 23, 1999

Related U.S. Application Data (63) Continuation-in-part of application No. 08/855,217, filed on May 13, 1997, now abandoned.

(51) Int. Cl.[7] .................................................. F02M 15/00

(52) U.S. Cl. .......................................... 123/541; 123/514

(58) Field of Search .................... 123/541, 514; 165/179, 183

(56) References Cited

U.S. PATENT DOCUMENTS

| | | |
|---|---|---|
| 1,031,422 * | 7/1912 | Clark ..................................... 123/541 |
| 1,860,063 | 5/1932 | Tobler . |
| 1,966,223 | 7/1934 | Sass . |
| 2,244,800 | 6/1941 | Pascale . |
| 2,264,914 | 12/1941 | L'Orange . |
| 2,286,658 | 6/1942 | Voit . |
| 2,886,014 | 5/1959 | Konrad et al. . |
| 2,965,303 | 12/1960 | Jackson . |
| 2,978,797 | 4/1961 | Ekelund . |
| 3,398,895 | 8/1968 | Claffey . |
| 3,450,351 | 6/1969 | Messerschmidt . |
| 3,451,627 | 6/1969 | Barber . |
| 3,612,012 | 10/1971 | Dreisin . |
| 3,945,353 | 3/1976 | Dreisin . |
| 3,958,757 | 5/1976 | Happel et al. . |
| 4,099,496 | 7/1978 | Nagase et al. . |
| 4,421,087 | 12/1983 | Schuurman . |
| 4,434,765 | 3/1984 | Eshelman . |
| 4,471,909 | 9/1984 | Perr . |
| 4,489,700 | 12/1984 | van der Weide . |
| 4,503,826 | 3/1985 | Kessler et al. . |
| 4,503,831 | 3/1985 | Rijkeboer . |
| 4,503,832 | 3/1985 | Pefley et al. . |
| 4,545,345 | 10/1985 | Pagdin et al. . |
| 4,570,602 | 2/1986 | Atkins et al. . |
| 4,676,478 | 6/1987 | Kiuchi . |
| 4,700,891 | 10/1987 | Hans et al. . |

(List continued on next page.)

FOREIGN PATENT DOCUMENTS

| | | |
|---|---|---|
| 4224908 A1 | 2/1993 | (DE) . |
| 2 246988 | 2/1992 | (GB) . |
| WO 81/00282 | 2/1981 | (WO) . |
| WO 92/08886 | 5/1992 | (WO) . |
| WO 92/08888 | 5/1992 | (WO) . |

OTHER PUBLICATIONS

"Gasoline Fuel Injector" SAE J1832 Nov. 1989, *Report of the Fuel Injection Subcommittee*, approved Nov. 1989, pp. 24.163–24.178.

*Primary Examiner*—John Kwon
(74) *Attorney, Agent, or Firm*—Merchant & Gould P.C.

(57) ABSTRACT

Apparatus for condensing return fuel in a fuel tank. The condenser comprises an elongated body having a passage therethrough in fluid communication with a fuel return line. A plurality of vent holes are spaced along the length of the body and communicated with the passage. The vent holes are sloped along the length of the passage so that gaseous fuel will tend to first exit vent holes toward a distal end of the passage. Both single and multiple passage condensers are disclosed.

31 Claims, 5 Drawing Sheets

U.S. PATENT DOCUMENTS

| | | |
|---|---|---|
| 4,704,591 | 11/1987 | Hafner . |
| 4,768,492 | 9/1988 | Widmer et al. . |
| 4,898,141 * | 2/1990 | Fiedler ................................. 123/541 |
| 4,901,974 | 2/1990 | Cook et al. . |
| 4,938,036 | 7/1990 | Hodgkins et al. . |
| 4,940,027 * | 7/1990 | Garms ................................. 123/541 |
| 4,957,085 | 9/1990 | Sverdlin . |
| 4,984,549 | 1/1991 | Mesenich . |
| 5,027,871 | 7/1991 | Guenther . |
| 5,033,444 | 7/1991 | Kaufman et al. . |
| 5,044,339 | 9/1991 | Hafner . |
| 5,046,702 | 9/1991 | Miyazawa et al. . |
| 5,050,840 | 9/1991 | Kondo et al. . |
| 5,076,242 | 12/1991 | Parker . |
| 5,076,244 | 12/1991 | Donaldson . |
| 5,085,402 | 2/1992 | O'Dell . |
| 5,136,986 | 8/1992 | Jensen . |
| 5,156,134 | 10/1992 | Tochizawa . |
| 5,174,262 | 12/1992 | Staerzl . |
| 5,183,209 | 2/1993 | Ricco et al. . |
| 5,197,436 | 3/1993 | Ozawa . |
| 5,233,963 | 8/1993 | Gregorius et al. . |
| 5,237,981 | 8/1993 | Polletta et al. . |
| 5,251,603 | 10/1993 | Watanabe et al. . |
| 5,291,869 | 3/1994 | Bennett . |
| 5,299,605 | 4/1994 | Bergamini et al. . |
| 5,325,838 | 7/1994 | Bennett . |
| 5,343,847 | 9/1994 | Chasteen et al. . |
| 5,355,846 | 10/1994 | Ozawa . |
| 5,377,645 | 1/1995 | Moore . |
| 5,423,303 | 6/1995 | Bennett . |
| 5,441,234 | 8/1995 | White et al. . |
| 5,479,906 | 1/1996 | Collie . |
| 5,533,486 | 7/1996 | Qutab . |
| 5,566,712 | 10/1996 | White et al. . |
| 5,595,160 | 1/1997 | Matsumoto et al. . |
| 5,735,342 | 4/1998 | Nitta . |

* cited by examiner

SYSTEM AND CONDENSER FOR FUEL INJECTION SYSTEM

CROSS REFERENCE

This is a Continuation-in-Part of U.S. patent application Ser. No. 08/855,217, filed May 13, 1997, now abandoned.

INCORPORATION BY REFERENCE

Applicant's U.S. Pat. Nos. 5,291,869; 5,325,838; and 5,423,303 are incorporated herein by reference.

FIELD OF THE INVENTION

This invention relates to fuel injection systems and more particularly to in-tank condensers for cooling return fuel in such systems.

BACKGROUND OF THE INVENTION

Liquefied petroleum gas ("LPG") fuel supply systems are known, for example as shown in Applicant's U.S. Pat. Nos. 5,291,869; 5,325,838; and 5,423,303. Such systems typically include a number of specialized fuel injectors which receive fuel from a high pressure tank. A fuel rail connected in-line with a series of injectors is often employed to deliver supply fuel to the injectors. In many systems, uninjected fuel is returned to the fuel tank. This is generally done to keep the supply fuel as cool as possible, particularly where it is intended to inject LPG in liquid rather than gaseous form.

One approach to injecting LPG without permitting it to vaporize is to pump high volumes of supply and return fuel. In this way, the supply fuel spends very little time near the heated engine compartment where it can vaporize. Another approach is to employ a refrigeration cycle as described in the Applicant's patents identified above. The evaporation of return fuel is used to cool supply fuel, thereby maintaining it in liquid form.

A problem with returning vaporized LPG to the fuel tank is that it can increase tank pressure substantially above the vapor pressure of the liquid in the tank. If the vapor does not condense before the pressure limit of the tank is exceeded, the pressure relief valve will release LPG vapor to the atmosphere. This is both unsafe and environmentally undesirable.

What has been needed is a way to cool return fuel in lLPG systems so as to reduce the high fuel tank pressures which can occur.

SUMMARY OF THE INVENTION

According to the present invention, an LPG fuel supply system, a method, and a condenser for fuel injection systems are provided.

In one aspect of the system, the LPG system includes a plurality of fuel injectors operably connected to a fuel rail. The fuel rail is in fluid communication with fuel supply and return lines. Both the fuel rail and injectors comprise an arrangement for cooling supply fuel with return fuel. A condenser in the return line cools return fuel.

In another aspect of the invention, the LPG fuel supply system comprises a plurality of fuel injectors in fluid communication with fuel supply and return lines. The fuel return line includes a mechanism for cooling return fuel.

In another aspect of the invention, the LPG fuel supply system comprises a plurality of fuel injectors in communication with a fuel supply line, which in turn communicates with a fuel tank. A condenser is positioned in the fuel tank. It comprises an elongated body having a passage therethrough in fluid communication with a fuel return line A plurality of vent holes spaced along the length of the body, for returning return fuel to the fuel tank, communicate with the passage. The vent holes are sloped relative to horizontal along the length of the body such that gaseous fuel will tend to first exit vent holes toward the distal end of the passage.

In another aspect of the invention, an apparatus for condensing return fuel in a fuel tank comprises an elongated body having a passage therethrough in fluid communication with a fuel return line. A plurality of vent holes spaced along the length of the body communicate with the passage. The body, passage, and vent holes are constructed and arranged such that gaseous fuel will tend to first exit vent holes toward the distal end of the passage.

In the method of the present invention, a liquefied petroleum gas fuel supply system is provided, comprising a plurality of fuel injectors in fluid communication with a fuel supply line and fuel return line. Vaporous fuel is produced in the fuel return line by the absorption of heat. The vaporous fuel is then cooled in the fuel return line prior to introducing it into the fuel in the fuel tank.

These and other advantages and features of novelty which characterize the invention are pointed out with particularity in the claims annexed hereto. However, for a better understanding of the invention and its advantages, reference should be made to the drawings which form a further part hereof, and to the accompanying descriptive matter in which there is illustrated and described a preferred embodiment of the invention.

DETAILED DESCRIPTION OF PREFERRED EMBODIMENTS

Referring now to the drawings, wherein like numerals designate like parts throughout the figures, a fuel supply system 10 for providing LPG to an internal combustion engine 12 is shown. Applicant's U.S. Pat. Nos. 5,291,869 ("'869 patent"), "LIQUEFIED PETROLEUM GAS FUEL SUPPLY SYSTEM," 5,325,838 ("'838 patent"), "LIQUEFIED PETROLEUM GAS FUEL INJECTOR," and 5,423,303 ("'303 patent"), "FUEL RAIL FOR INTERNAL COMBUSTION ENGINE" are also incorporated by reference and will be referred to herein as appropriate.

System 10 includes a fuel rail 14 which delivers fuel to a plurality of fuel injectors 16. Although a fuel rail is shown in the preferred embodiment, one is not necessary within the principles of the invention. For example, separate supply lines branching from a main supply line could deliver fuel to each injector in parallel.

In the preferred embodiment, both fuel rail 14 and injector 16 include arrangements for cooling supply fuel with return fuel, such as those described in the '869 patent generally, and more specifically in the '303 patent for the fuel rail and the '838 patent for the fuel injector. These arrangements involve evaporating return fuel in close proximity to supply fuel so as to extract heat from the supply fuel. In this way, supply LPG is maintained in liquid form when injected. It is not necessary. however, for the fuel rail or injectors to have such a refrigeration cycle, as there are other ways in which liquid LPG at injection can be achieved.

The main problem the present invention addresses is the high tank pressures which can result when heated LPG is returned to the fuel tank 18. Under the present regulations in the United States, the maximum allowable tank pressure is 312.5 psi. A pressure relief valve (not shown) would be opened if this maximum pressure is reached.

Return fuel is heated in its passage through the engine compartment by the engine itself. It can also be heated if a refrigeration cycle such as that in the preferred embodiment is employed. If the return line is routed under the chassis, engine, transmission, exhaust and radiator heat will also tend to be absorbed there. The problem is most pronounced at high engine and ambient temperatures and at low fuel levels.

Figure 1:
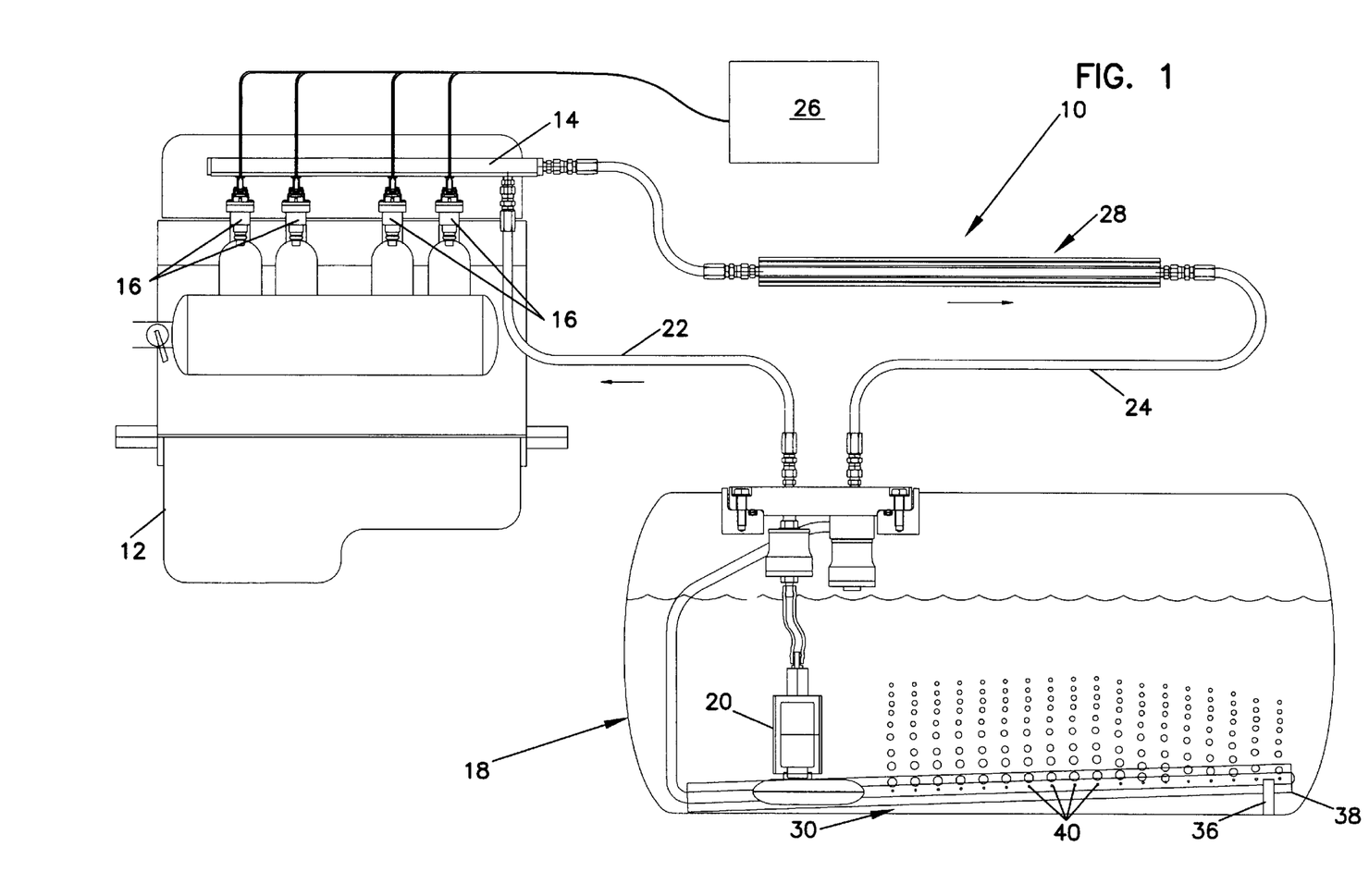
FIG. 1 is a schematic diagram of a system according to the present invention.
Figure 2:
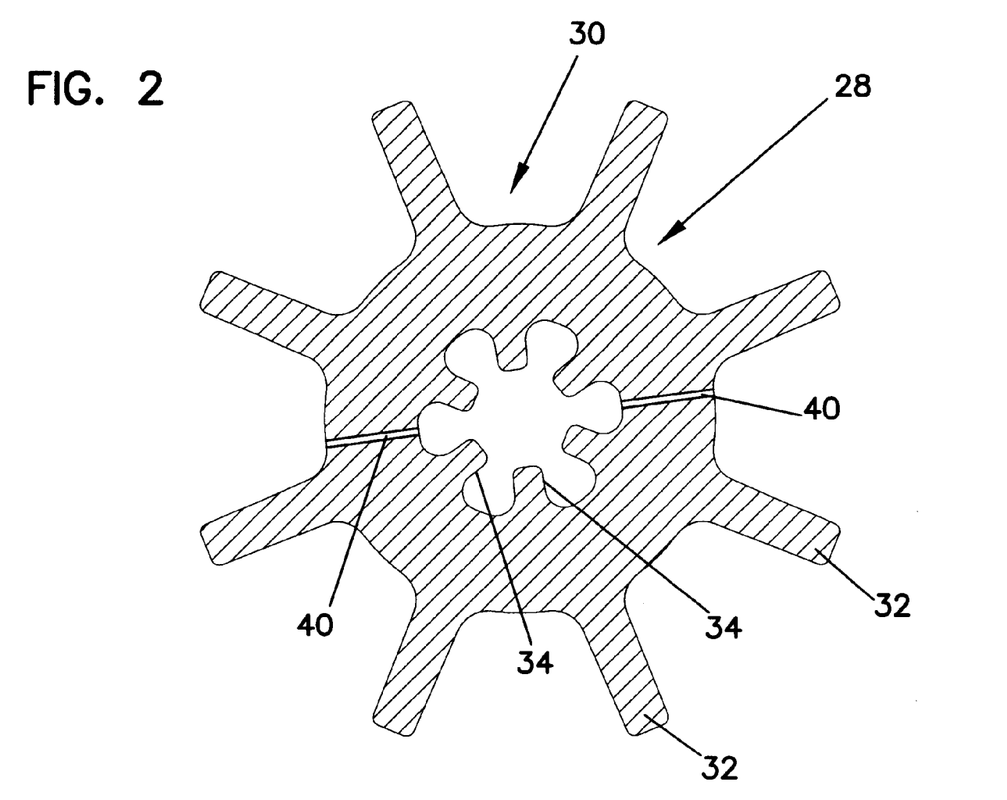
FIG. 2 is a cross-sectional view of condensers according to the present invention.

Referring to FIGS. 1 and 2, a system and method for addressing this problem will be described. In addition to the fuel injectors 16 and fuel rail 14 described above, system 10 includes fuel pump 20, supply line 22 and return line 24. As is generally the case, an engine control unit 26 controls injectors 16.

Return fuel is cooled in the preferred embodiment by in-line 28 and in-tank 30 condensers in return line 24. As shown in FIG. 2, condensers 28, 30 have external 32 and internal 34 fins to aid heat transfer. They are made of extruded aluminum.

In-line condenser 28, and as much of return line 24 as possible, are preferably located away from the hot under-chassis. Cooler air can then assist in extracting heat from return fuel in condenser 28. If necessary, through ducting or otherwise, air can be forced across external fins 32 to further increase cooling. It may also be necessary to thermally insulate return line 24, as for example by surrounding with foam rubber.

In-tank condenser 30 is immersed in fuel tank 18 at a terminal end of return line 24. Condenser 30 is placed below the fuel level in the tank so heat can be transferred to the liquid fuel. It is preferably mounted at the bottom of tank 18 to maximize exposure. Condenser 30 is elevated by legs 36 at its distal end 38 and has a plurality of vent holes 40 from which return fuel enters the fuel in tank 18. By this arrangement, gaseous fuel tends to be cooled along the entire length of condenser 30 before exiting near distal end 38. Spreading vent holes across tank 18 reduces the localized heat which would otherwise occur. Vent holes 40 are also preferably small, on the order of 0.03–0.13 inches diameter, preferably 0.09 inches, to create smaller bubbles which will condense faster. The total flow area through vent holes 40 is at least twice and preferably four times the cross-sectional area of return line 24 to minimize back pressure. While vent holes 40 are shown at approximately the horizontal quadrant of condenser 30, it may be preferable to position them lower to improve cooling.

Figure 3:
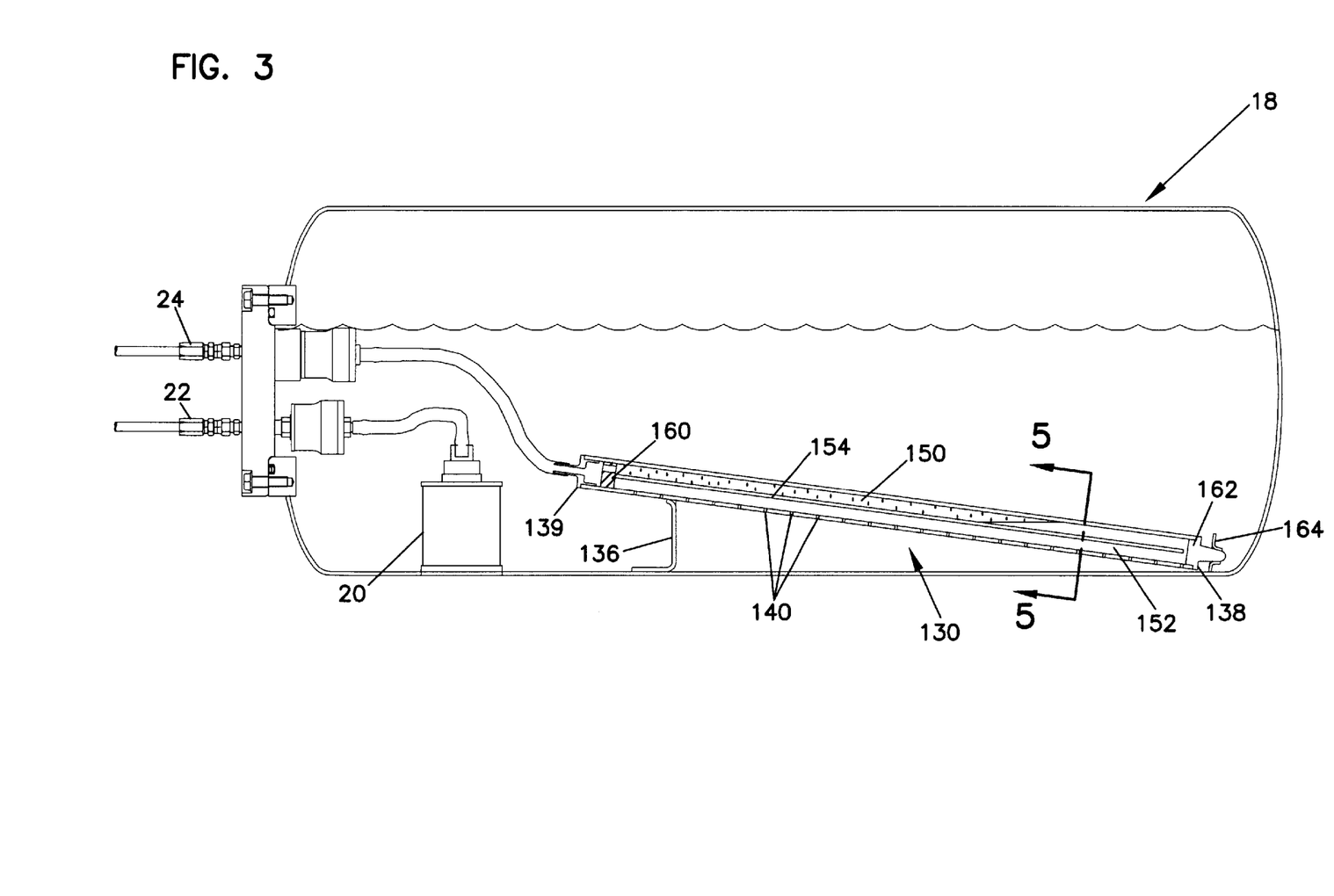
FIG. 3 is a cross-sectional view of a second embodiment of an in-tank condenser according to the present invention, installed in a fuel tank and depicting a low thermal load scenario.
Figure 4:
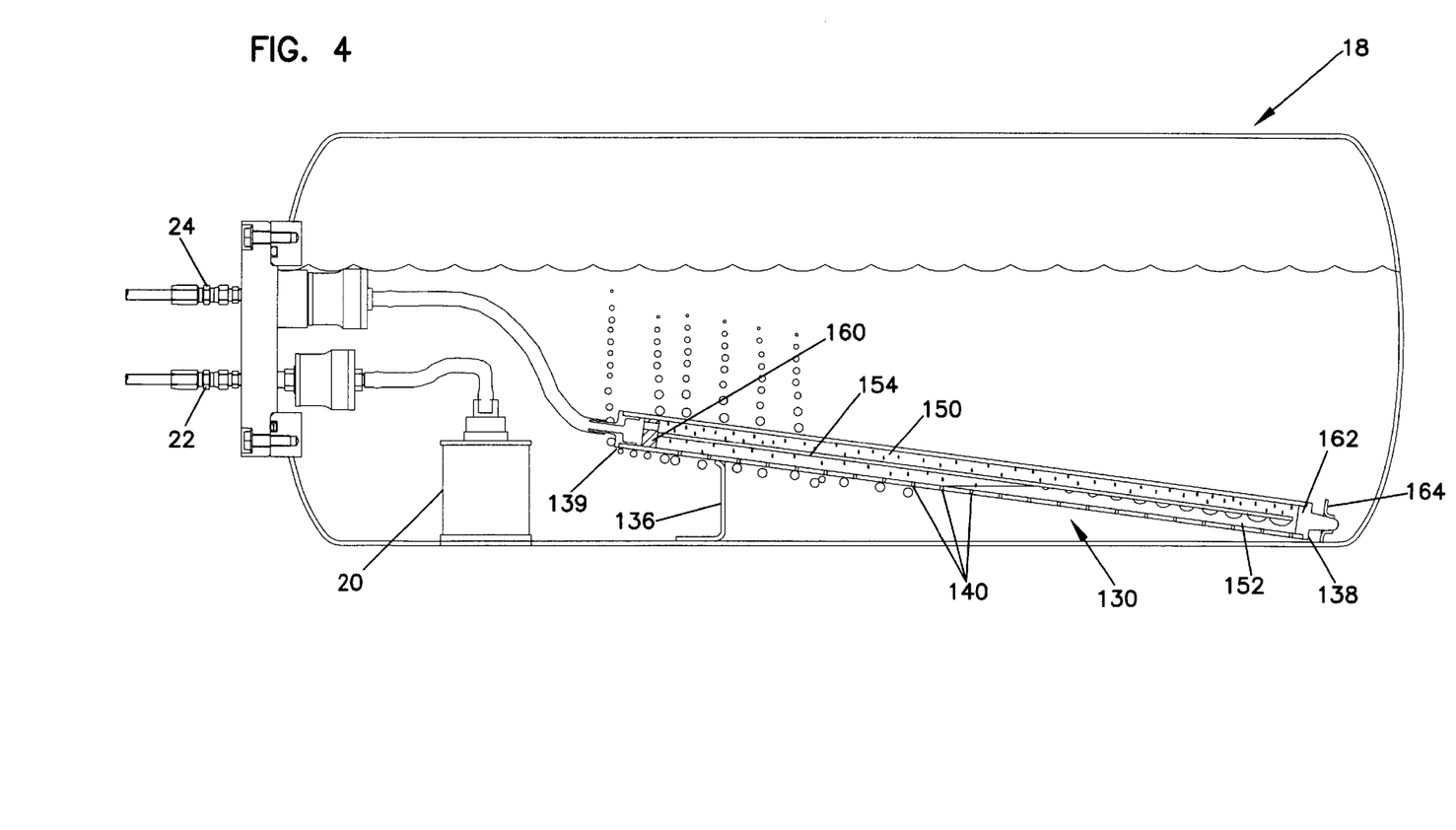
FIG. 4 is the in-tank condenser of FIG. 3, depicting a high thermal load scenario.
Figure 5:
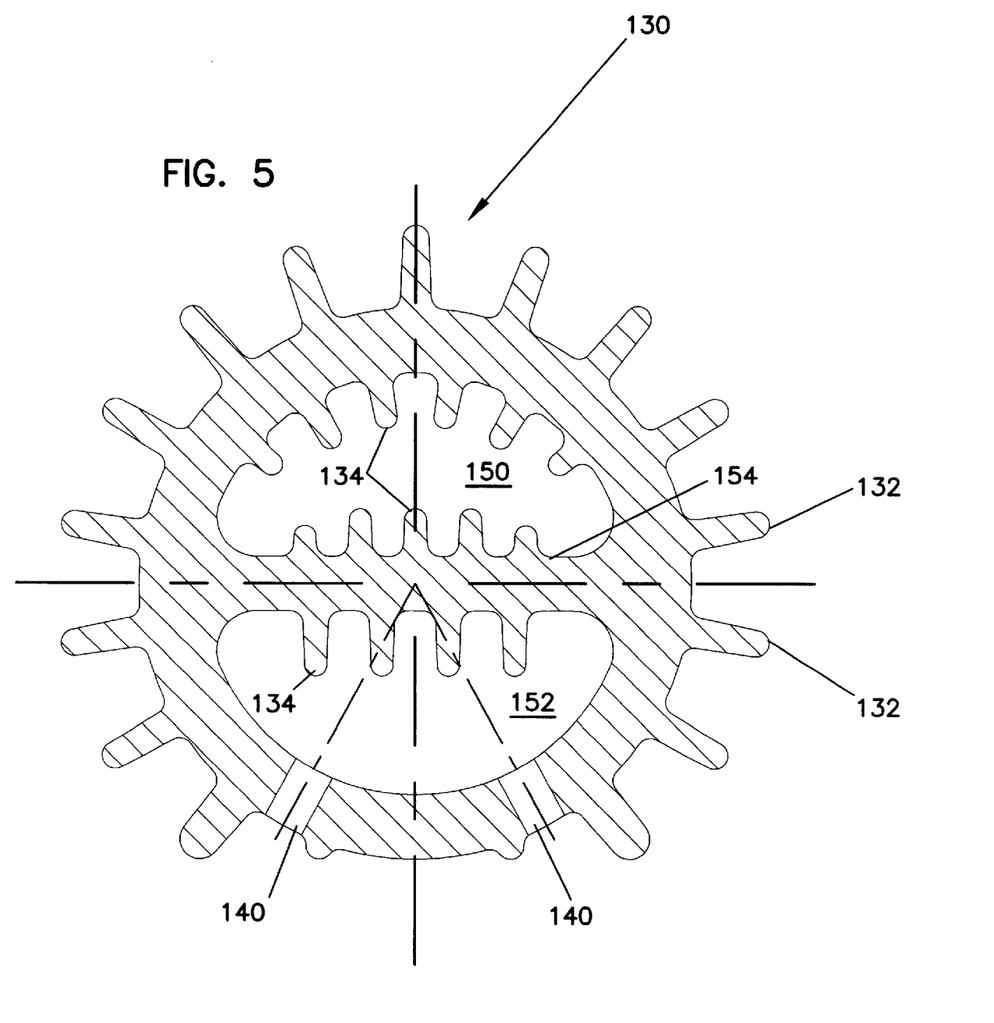
FIG. 5 is a cross-sectional view of the in-tank condenser shown in FIG. 3, taken generally along lines 5—5.

A second embodiment of an in-tank condenser 130 is shown in FIGS. 3–5. Condenser 130 is in many ways similar to condenser 30, and therefore like reference numerals (+100) are used where appropriate, and the below discussion will primarily discuss the differences between the two.

Condenser 130 has upper 150 and lower 152 passage portions communicating with one another at a distal end 138 of the body of the condenser. Plug 160, made of plastic, closes lower passage 152 at its terminal or distal end, and has an opening therethrough so that return fuel can flow from return line 24 into upper passage 150. Plug 162 closes off the opposite, distal end of the aluminum extrusion, leaving enough room between it and the end of dividing wall 154 so that communication between passages 150, 152 can occur. External 132 and internal 134 fins assist in heat transfer, both between the tank fuel and passages 150, 152 and between the passages 150, 152 themselves.

As with the first embodiment, condenser 130 is sloped so as to cause maximum phase change to liquid within the condenser. Support 136 elevates proximal end 139, and bracket 164 is welded to tank 18 to secure distal end 138. In conjunction with the double-passage arrangement, this significantly improves phase change. FIG. 3 shows a low thermal load scenario. Any vapor that enters condenser 130, by buoyancy, stays in upper passage 150 so that, by the time the fuel reaches vent holes 140 in lower passage 152, it is in liquid form. In the high thermal load scenario shown in FIG. 4, vapor similarly gravitates to the high, proximal end 139 of lower passage 152. Fuel that does exit condenser 140 in vaporous form thus has been cooled along the longest possible path; the hottest vapors will also travel the longest distances due to their greater buoyancy, including along the length of internal fins 134 on the bottom side of dividing wall 154. Uncondensed vapor also rides along the bottom side of dividing wall 154 within liquid fuel at the lower end of lower passage 152 until much of it too condenses and drops into that liquid. All of these factors contribute to maximum heat transfer before return fuel leaves the condenser.

Vent holes 140 are preferably located in the lower quadrant of condenser 130 so as to further maximize heat transfer before fuel exits condenser 130. The size of vent holes 140, and their total flow area, are preferably the same as those set forth above for the first embodiment.

Employing a multi-passage condenser like that of the second embodiment 130 has certain advantages compared to the first embodiment 30. It allows the condenser to be shorter and to have the inlet located at the high end of the condenser, both of which save space that can be valuable in certain applications. Cooling on the order of 200 watts or higher can be obtained from the double pass condenser (second embodiment), compared to what is believed to be about half that amount for the single pass (first embodiment). It will be understood that a condenser employing three or more passages could also be used within the principles of the invention.

Sloping vent holes according to the invention greatly improves the performance of the in-tank condensers. Although the inventor has not yet conducted tests that quantify the performance advantage over a condenser without sloped vent holes, it is expected that the difference is significant because of the physics and thermodynamics involved, as discussed above. The preferred slope is about between 4–15 degrees. As can be seen in FIG. 1, the slope for the first embodiment is about 4 degrees. The preferred slope for the second embodiment, shown in FIGS. 3 and 4, is about 8 degrees.

It should be understood that the present invention is not limited to the preferred embodiments discussed above, which are illustrative only. For example, sloping vent holes could be achieved in a number of other ways, such as by having a horizontal condenser with vent holes formed progressively further down along the length of the body. The type and number of heat transfer devices and their size, shape and arrangement can also be varied within the principles of the invention. Other changes may be made in detail, especially in matters of shape, size, arrangement of the parts, order of steps or material of components within the principles of the invention, to the full extent indicated by the broad, general meanings of the terms in which the appended claims are expressed.

What is claimed is:

1. A fuel supply system for providing liquefied petroleum gas to an internal combustion engine, comprising:
    (a) a plurality of fuel injectors in fluid communication with a fuel supply line communicating with a fuel tank;
    (b) a fuel return line; and
    (c) a condenser positioned in said fuel tank, comprising:
        (i) an elongated body having a passage therethrough in fluid communication with said fuel return line; and
        (ii) a plurality of vent holes spaced along a length of said body, for returning return fuel to said fuel tank, and communicating with said passage;
        (iii) said vent holes being sloped at least 4° relative to horizontal along said length such that gaseous fuel will tend to first exit vent holes toward a distal end of said passage.

2. A fuel supply system according to claim 1, wherein said condenser has external fins for transferring heat from the return fuel.

3. A fuel supply system according to claim 1, wherein said condenser has internal fins for transferring heat from the return fuel.

4. A fuel supply system according to claim 1, wherein said condenser is mounted proximate a bottom of said fuel tank.

5. A fuel supply system according to claim 1, wherein said passage is a straight passage beginning at a proximal end of said body and ending at a distal end.

6. A fuel supply system according to claim 5, wherein said distal end of said body is raised relative to said proximal end, thereby sloping said vent holes.

7. A fuel supply system according to claim 1, wherein said vent holes are at a constant height relative to said body and passage.

8. A fuel supply system according to claim 1, wherein said vent holes are about between 0.03 and 0.13 inches in diameter.

9. A fuel supply system according to claim 1, wherein a total area of said vent holes is greater than twice an internal cross-sectional area of said fuel return line.

10. A fuel supply system according to claim 1, wherein said vent holes are arranged on opposite sides of said body proximate a middle height of said passage.

11. A fuel supply system according to claim 1, wherein said passage comprises at least two portions in which return fuel travels in generally opposite directions.

12. A fuel supply system according to claim 11, wherein said passage comprises a top portion extending to approximately a distal end of said body and a bottom portion extending to approximately a proximal end of said body, said return fuel line connected to said top portion proximate said proximal end, said passage portions communicating proximate said distal end, and said vent holes formed in said bottom portion.

13. A fuel supply system according to claim 12, wherein said proximal end of said body is raised relative to said distal end, thereby sloping said vent holes.

14. A fuel supply system according to claim 12, wherein said vent holes are arranged on opposite sides of said bottom portion beneath a middle of said passage in said bottom portion.

15. A fuel supply system according to claim 14, said condenser body further including a longitudinally extending external fin arranged above said vent holes such that gaseous bubbles exiting said vent holes will travel along said fin prior to rising upwardly in the tank.

16. An apparatus for condensing return fuel in a fuel tank, comprising:
    (a) an elongated body having a passage therethrough in fluid communication with a fuel return line; and
    (b) a plurality of vent holes spaced along a length of said body and communicating with said passage;
    (c) said body, passage and vent holes constructed and arranged such that said vent holes are generally sloped at least 4° relative to horizontal along said length, whereby gaseous fuel will tend to first exit vent holes toward a distal end of said passage.

17. An apparatus according to claim 16, further including external fins extending generally radially from said body.

18. An apparatus according to claim 16, further including internal fins extending generally radially into said passage from said body.

19. An apparatus according to claim 16, wherein said passage is a relatively straight passage beginning at a proximal end of said body and ending at a distal end.

20. An apparatus according to claim 19, wherein said distal end of said body is raised relative to said proximal end, thereby sloping said vent holes.

21. An apparatus according to claim 16, wherein said vent holes are at a constant height relative to said body and passage.

22. An apparatus according to claim 16, wherein said vent holes are about between 0.03 and 0.13 inches in diameter.

23. An apparatus according to claim 16, wherein a total area of said vent holes is greater than twice an internal cross-sectional area of said fuel return line.

24. An apparatus according to claim 16, wherein said vent holes are arranged on opposite sides of said body proximate a middle height of said passage.

25. An apparatus according to claim 16, wherein said passage comprises at least two portions in which return fuel travels in generally opposite directions.

26. An apparatus according to claim 25, wherein said passage comprises a top portion extending to approximately a distal end of said body and a bottom portion extending to approximately a proximal end of said body, said return fuel line connected to said top portion proximate said proximal end, said passage portions communicating proximate said distal end, and said vent holes formed in said bottom portion.

27. An apparatus according to claim 26, wherein said proximal end of said body is raised relative to said distal end, thereby sloping said vent holes.

28. An apparatus according to claim 26, wherein said vent holes are arranged on opposite sides of said bottom portion beneath a middle of said passage in said bottom portion.

29. An apparatus according to claim 28, said condenser body further including a longitudinally extending external fin arranged above said vent holes such that gaseous bubbles existing said vent holes will travel along said fin prior to rising upwardly in the tank.

30. An apparatus for condensing return fuel in a fuel tank, comprising:
(a) an elongated body having a passage therethrough in fluid communication with a fuel return line; and
(b) a plurality of vent holes spaced along a length of said body and communicating with said passage;
(c) said body, passage and said vent holes being constructed and arranged such that gaseous fuel will tend to first exit vent holes toward a distal end of said passage;
(d) said passage comprising a top portion extending toward a distal end of said body and a bottom portion extending toward a proximal end of said body, with said vent holes formed in said bottom portion.

31. An apparatus according to claim 30, wherein said passage portions communicate proximate said distal end of said body so that said passage comprises no more than two parallel portions.

* * * * *